United States Patent [19]

Morita

[11] Patent Number: 5,025,410
[45] Date of Patent: Jun. 18, 1991

[54] COORDINATE READING APPARATUS

[75] Inventor: Yoshiyuki Morita, Tokyo, Japan

[73] Assignee: Seiko Instruments, Inc., Tokyo, Japan

[21] Appl. No.: 233,263

[22] Filed: Aug. 11, 1988

[30] Foreign Application Priority Data

Aug. 12, 1987 [JP] Japan ............................ 62-201487

[51] Int. Cl.5 .................. G02B 7/14; G08C 21/00; G09G 3/00
[52] U.S. Cl. ..................... 364/900; 364/236.8; 364/927.1
[58] Field of Search ................... 178/18, 19, 20; 364/556, 900, 200

[56] References Cited

U.S. PATENT DOCUMENTS

| | | | |
|---|---|---|---|
| 3,732,557 | 5/1973 | Evans et al. | |
| 4,617,515 | 10/1986 | Taguchi et al. | 178/19 |
| 4,786,765 | 2/1988 | Yamanami et al. | 178/19 |
| 4,794,209 | 12/1988 | Asada et al. | 178/19 |
| 4,806,918 | 2/1989 | Berke et al. | 178/18 |
| 4,810,838 | 3/1989 | Ichinokawa et al. | 178/19 |
| 4,910,363 | 3/1990 | Kobayashi et al. | 178/18 |

FOREIGN PATENT DOCUMENTS

| | | |
|---|---|---|
| 0156593 | 3/1985 | European Pat. Off. |
| 0242598 | 3/1987 | European Pat. Off. |
| 57-141785 | 12/1982 | Japan |
| 59-055586 | 7/1984 | Japan |

Primary Examiner—Michael R. Fleming
Assistant Examiner—Robert S. Hauser
Attorney, Agent, or Firm—Spensley Horn Jubas & Lubitz

[57] ABSTRACT

A coordinate reading apparatus for inputting coordinate data to a computer and operable in either a relative coordinate mode or an absolute coordinate mode, the apparatus including a tablet defining a coordinate surface and a coordinate designator movable across the surface so that signals are generated which are inversely proportional to the distance between the designator and the surface. In order to derive an indication of the position of the designator relative to the surface, the generated signals are compared with a reference signal and an output is produced only when the maximum generated signal exceeds the reference signal. The value of the reference signal is varied in dependence on which coordinate mode is to be employed.

6 Claims, 3 Drawing Sheets

FIG. 2
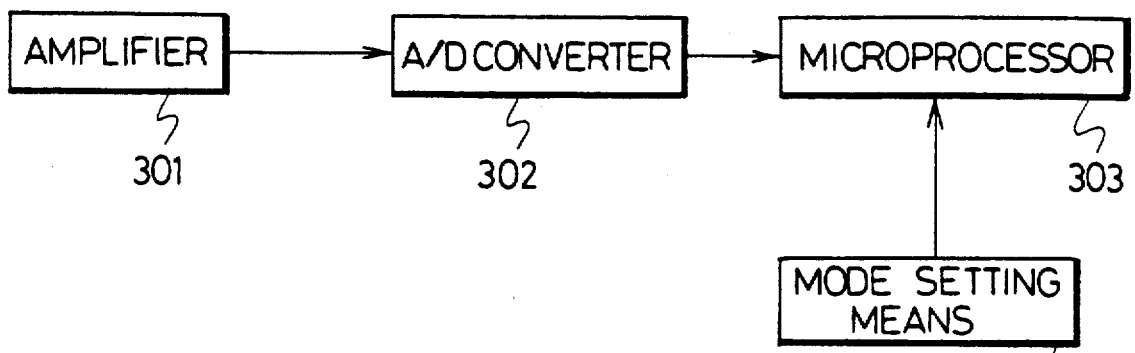
FIG. 4
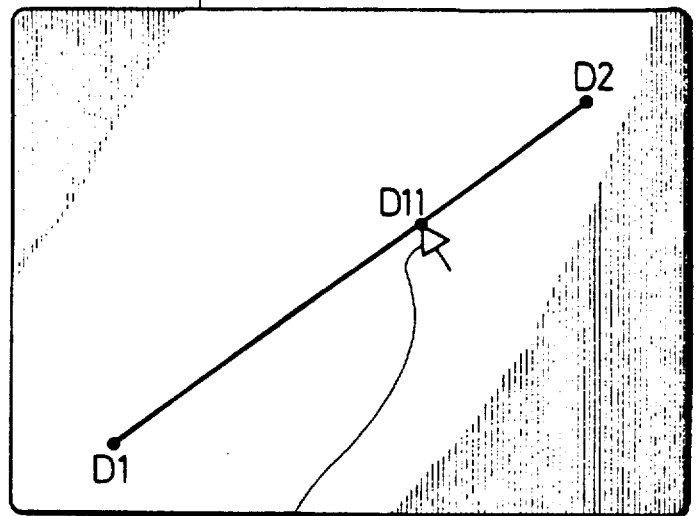
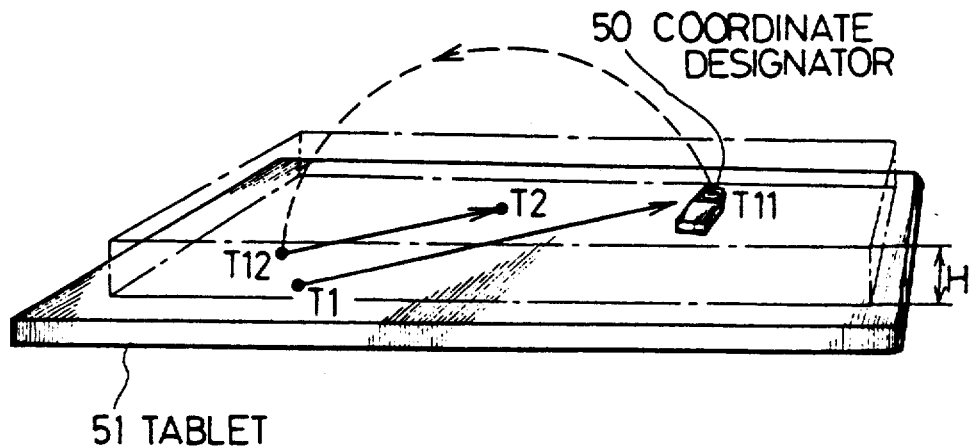

COORDINATE READING APPARATUS

BACKGROUND OF THE INVENTION

1. Field of the Invention

This invention relates to a coordinate reading apparatus used for inputting position data to a computer, and more particularly to a coordinate reading apparatus which has a coordinate designator, a tablet, and a system for calculating induction signals induced in either the coordinate designator or the tablet due to electric coupling between them, to obtain coordinate values.

2. Description of the Prior Art

Known coordinate reading apparatus generally operate on the basis of electromagnetic induction or electrostatic induction.

The fundamental constitution and operation of the coordinate reading apparatus of the electromagnetic induction type are disclosed in Japanese Patent Publication No. 16317/1984 relating to coordinate reading method and apparatus and in Japanese Patent Publication No. 35069/1984 relating to interpolation system for a coordinate reader.

The coordinate reading apparatus of this kind are capable of reading data even when the coordinate designator is spaced from the tablet by a distance, or height, up to a predetermined value. This height is called "reading height".

Apparatus of this type may be constructed to operate according to the absolute coordinate mode or the relative coordinate mode.

In the "absolute coordinate mode", the position where the coordinate designator is placed is expressed as a coordinate value in a coordinate system which is fixed relative to the tablet, and the coordinate that is read out is referred to as an "absolute coordinate".

In the "relative coordinate mode", when the coordinate designator is once moved away by more than the reading height and is then brought within the reading height, the position initially detected within the reading height is regarded to be an origin, the coordinate value detected thereafter is expressed as an increment from the origin, and the coordinate that is read out is referred to as a "relative coordinate".

The relative coordinate mode is generally used for coordinate reading apparatus to control the cursor of a display unit. FIG. 4(a) shows such a display unit having a display screen 52 on which appears a cursor 53 the movement of which is to be controlled. FIG. 4(b) shows coordinate reading apparatus composed of a tablet 51 and a coordinate designator 50.

When it is desired to move cursor 53 from a point D1 to a point D2 on display screen 52, the operation is carried out as described below.

Coordinate designator 50 is moved from T1 to T11 remaining within the reading height H. By this operation, cursor 53 is moved from D1 to D11.

Coordinate designator 50 is then lifted up above reading height H, and is moved from T11 to T12 which is close to T1. In this case, no new coordinate value is produced, and cursor 53 does not move.

Coordinate designator 50 is moved from T12 to T13 while remaining within reading height H. By this operation, cursor 53 is moved from D11 to D2.

What is characteristic in this operation is that the coordinate designator 50 is lifted up by a distance greater than reading height H and is then returned back to a point T close to the initial position.

The absolute coordinate mode, on the other hand, is often used for operations where a medium to be read, such as a drawing, is placed on the tablet, and points thereon are read out. The medium to be read has a certain thickness and the apparatus is usually so designed that the reading is made as large as possible.

One existing coordinate reading apparatus has been designed to be capable of selecting relative coordinate mode and the absolute coordinate mode. The reading height in such coordinate reading apparatus, however, has generally been set to a slightly large constant value to take into consideration the case where the apparatus will be used in the absolute coordinate mode.

When the conventional coordinate reading apparatus is used in the relative coordinate mode, the coordinate designator must be lifted up by a large distance to return it to the initial position since the reading height has been set to a large value, causing a considerable reduction in operating convenience.

The reading height may be set to a small value if it is simply desired to improve the above-mentioned operability. This, however, would cause the basic performance of the coordinate reading apparatus to be deteriorated.

SUMMARY OF THE INVENTION

It is therefore an object of the present invention to provide a coordinate reading apparatus having not only high performance in the absolute coordinate mode but also convenient operation in the relative mode.

It is another object of the invention to provide a coordinate reading apparatus employing a different reading height in each of the absolute mode and the relative mode.

In the thus constituted coordinate reading apparatus, when either the relative coordinate mode or the absolute coordinate mode is selected, a comparison value for the induction signal is selected accordingly, and the comparison value is compared with a maximum value of the induction signals to determine whether the output should be produced or not. Here, selecting means is so constituted that the reading height becomes relatively small when the relative coordinate mode is selected. Therefore, there is no need to lift the coordinate designator to a great height during the operation where the relative coordinate mode is applied, i.e., in the operation for lifting up the coordinate designator to move it, and this helps to strikingly improve the operating convenience of the apparatus. When the absolute coordinate mode is selected, furthermore, the reading height is set to a large value, and the basic coordinate reading performance is not deteriorated.

BRIEF DESCRIPTION OF THE DRAWING

FIG. 2 is a block diagram of a coordinate calculation unit which can be used in the apparatus of FIG. 1.

FIG. 4(a) is a pictorial view of a display screen with a cursor.

FIG. 4(b) is a perspective view of a tablet and coordinate designator used to explain the relative coordinate mode.

DESCRIPTION OF THE PREFERRED EMBODIMENTS

Figure 1:
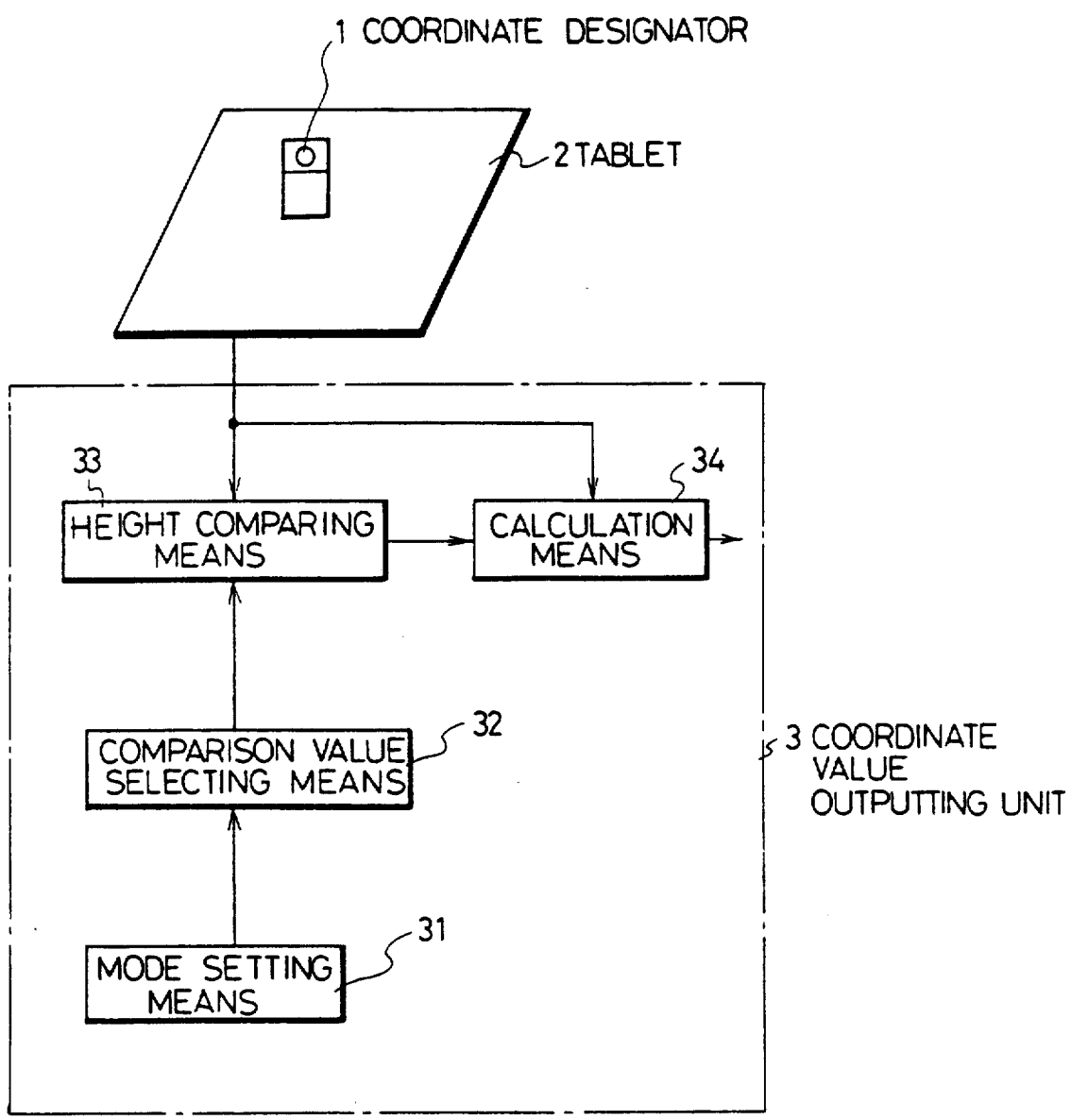
FIG. 1 is a block diagram of a coordinate reading apparatus embodying the invention.

The structure of a coordinate reading apparatus of the present invention will be described first with reference to FIG. 1 which is a block diagram of the coordinate reading apparatus according to the present invention.

A coordinate designator 1 which has a coil (not shown) for generating an alternating magnetic field is disposed above a tablet 2 which contains a plurality of conductors (not shown) called sense lines. The sense lines are connected to a coordinate value outputting unit 3 containing a mode setting means 31 which produces signals depending upon a mode that is set, a comparison value selecting means 32 which receives a signal from mode setting means 31 and produces a comparison value depending upon the mode, and a height comparing means 33. The induction signal produced in each sense line of tablet 2 is compared in height comparing means 33 with a comparison value produced by comparison value selecting means 32 to determine whether a coordinate value is to be calculated. The comparison result produced by means 33 is supplied to calculation means 34 which, when the signal produced by height comparing means 33 indicates that a coordinate is to be calculated, receives the induction signal from the tablet 2 to calculate coordinate values.

The output of calculation means 34 is connected to an external unit (not shown) such as a computer that works as a general purpose interface, and the calculated coordinate value is produced. Means 31, 32, 33 and 34 constitute the coordinate outputting unit 3.

The operation of this unit will be described next. In tablet 2, the sense lines are selected successively. The operation for selecting a predetermined number of sense lines is called "scanning". When coordinate designator 1 is placed on tablet 2, the scanning is effected and induction signals are successively generated on the sense lines due to alternating current signals generated by coordinate designator 1. The highest amplitude induction signals are generated on the sense lines nearest coordinate designator 1. A maximum value of the induction signal is called its "peak value". The peak value is a function of the height of coordinate designator 1 above tablet 2. The peak value increases as coordinate designator 1 is brought closer to the surface of tablet 2 and decreases as coordinate designator 1 is brought away from the surface of tablet 2.

Mode setting means can be set, for example manually, for either the relative coordinate mode or the absolute coordinate mode and this determines the value of the control signal produced by mode setting means 31. That control signal is input to comparison value selecting means 32 which selects a comparison value corresponding to the selected mode for comparison with the induction signal peak values.

The height comparing means 33 compares each peak value input from tablet 2 with the selected comparison value to determine whether a coordinate value is to be calculated. The comparison value is selected to be relatively high in the relative coordinate mode and relatively low in the absolute coordinate mode. In the relative coordinate mode, therefore, the coordinate is not calculated unless the peak values are greater than those which will trigger calculation in the absolute coordinate mode, i.e., unless the coordinate designator is brought relatively close to the tablet, and the object of the invention is thus accomplished. The induction signal whose reading height is thus determined and produced, is then converted into a coordinate value by calculation means 34 and is sent to the external unit. In this case, calculation means 34 finds a value for either a relative coordinate or an absolute coordinate depending upon the data from mode setting means 31.

The aforementioned coordinate outputting unit 3, in practice, is realized by a microprocessor and a program therefor.

FIG. 2 is a block diagram which more concretely illustrates the coordinate outputting unit 3 of FIG. 1. The induction signal produced in tablet 2 is amplified in an amplifier 301 and is converted into a digital signal by an A/D converter 302. That digital signal is input to a microprocessor 303. Mode setting means 31 is realized by an electric switch whose setting is read by microprocessor 303.

Determination of the height of coordinate designator 1 based on the peak induction signal value, determination of whether the coordinate value is to be calculated, and the processing for calculating the coordinate value are controlled by appropriate stored programming.

Figure 3:
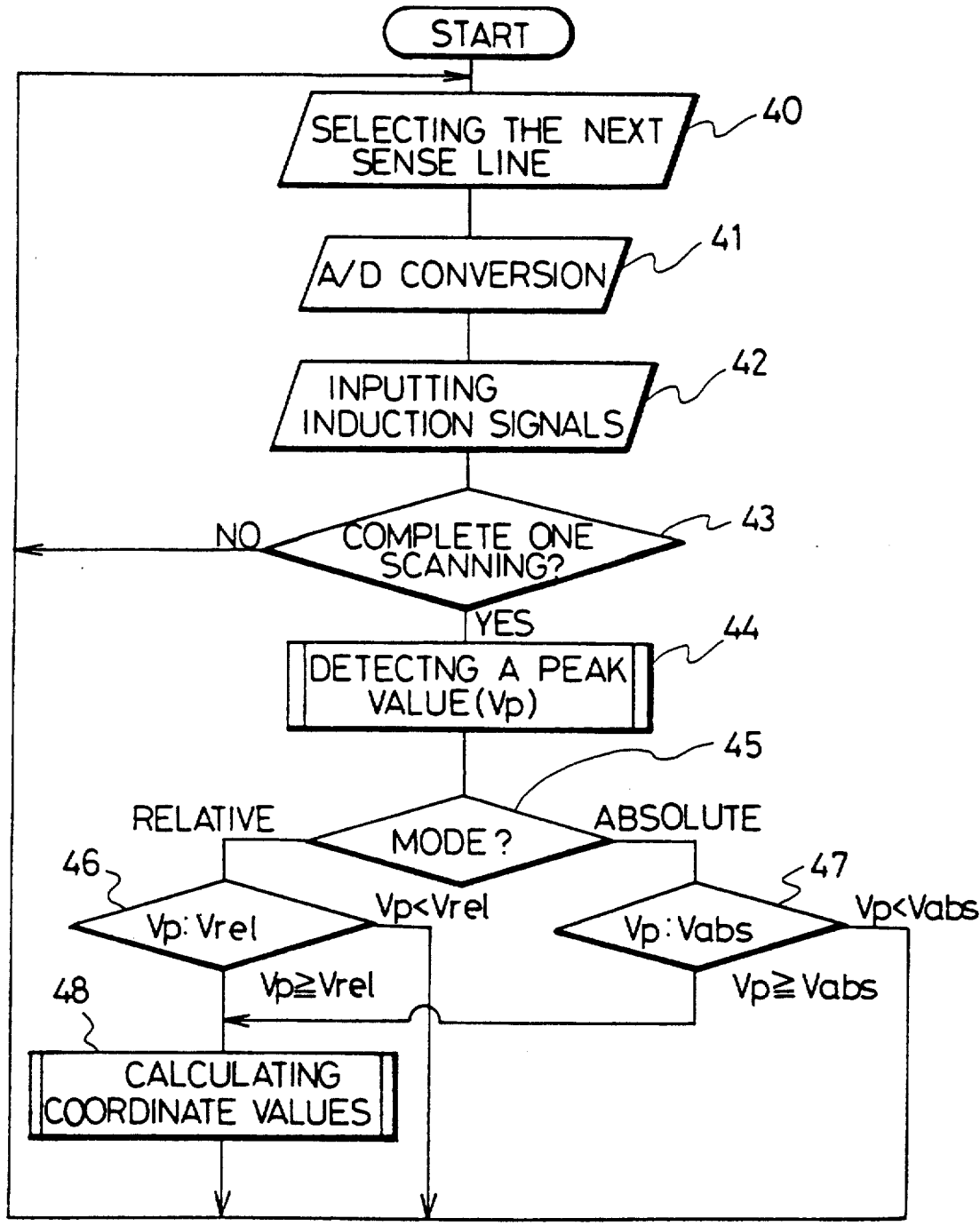
FIG. 3 is a flow chart showing the operation of the coordinate calculation unit.

FIG. 3 is a flow chart of suitable program for coordinate calculation unit 3. Sense lines are scanned by steps 40, 41, 42 and 43 to effect the processing for inputting the induction signals. When one scanning is completed, as indicated in step 43, a peak value is detected in step 44 out of the signals that are input. The peak value is denoted by Vp.

Mode setting means is interrogated in step 45 to determine whether the relative coordinate mode or the absolute coordinate mode has been set. When the mode is the absolute coordinate mode, a step 46 is executed and the peak value Vp is compared with a first comparison value Vrel. When $Vp \geq Vrel$ in this processing, a coordinate value is calculated from the induction signal in a step 48 and is sent to an external unit. When $Vp < Vrel$, the coordinate value is not calculated, and the processing returns again to the scanning. When the absolute coordinate mode is detected in the step 45, a step 47 is executed. The comparison value of step 47 is different from that of step 46; i.e., $Vrel > Vabs$ to achieve the object of the invention.

The setting of the reading height level, i.e., the setting of values for Vrel and Vabs, should be determined on the basis of evaluation experiments performed in practice. According to one preferred embodiment, the comparison values are set so that the reading height is about 10mm in the absolute coordinate mode and is about 3mm in the relative coordinate mode.

As described above, the present invention provides a coordinate reading apparatus which selects either the relative mode or the absolute mode to calculate a coordinate value, the reading height being set to be relatively low in the relative mode and being set to be relatively high in the absolute coordinate mode. In the relative coordinate mode, therefore, the coordinate designator need not be lifted up as high during the operation for moving the coordinate designator by lifting it up, contributing to improved operability. In the absolute coordinate mode, furthermore, the reading height can be maintained as in conventional practice.

While invention has been described in connection with a coordinate reading apparatus of the electromagnetic induction type, it is also applicable to the other system in which the coordinate designator and the tablet need not be brought into contact with each other to obtain the coordinate data.

What is claimed is:

1. A coordinate reading apparatus for inputting coordinate data to a computer and operable in a selected one of a relative coordinate mode and a second mode, said apparatus comprising: a first member constituting a tablet defining a coordinate surface; a second member in the form of a coordinate designator movable across said surface so that a distance exists between said designator and said surface; position signal producing means associated with said members for producing a plurality of induced signals each inversely proportional to the distance between said designator and said surface so that one of the induced signals will have a value greater than the value of each other induced signal so that the value of the one of the induced signals will be a maximum induced signal value relative to the values of all of the induced signals; and coordinate value outputting means connected to said position signal producing means for producing coordinate value output signals representative of the coordinate value of the point designated by said designator, wherein said outputting means comprise:

mode setting means responsive to a setting operation for generating a control signal indicative of the relative coordinate mode;

selecting means for producing a first signal representing a predetermined value in the absence of the control signal, and responsive to the control signal for selectively producing, in place of the first signal, a second signal representing a value greater than the predetermined value;

comparator means connected to said position signal producing means and to said selecting means for comparing the maximum induced signal value produced by said position signal producing means with the signal being produced by said selecting means and producing a comparison signal when the maximum induced signal value exceeds the value represented by the signal being produced by said selecting means; and coordinate value calculating means connected to said position signal producing means and to said comparator means for producing a coordinate value output signal from the induced signal value occurring in the time coincidence with the comparison signal.

2. Apparatus as defined in claim 1 wherein the two modes are absolute coordinate value mode and relative coordinate value mode and said calculating means are operative for producing coordinate value output signals associated with either mode.

3. Apparatus as defined in claim 2 wherein said calculating means are connected for producing output signals based on the selected mode indicated by the control signal.

4. A coordinate reading apparatus for inputting coordinate data to a computer and operable in a selected one of a relative coordinate mode and an absolute coordinate mode, said apparatus comprising: a first member constituting a tablet defining a coordinate surface; a second member in the form of a coordinate designator movable across said surface so that one of the induced signals will have a value greater than the value of each other induced signal so that the value of the one of the induced signals will be maximum induced signal value relative to the values of all of the induced signals; position signal producing means associated with said members for producing a plurality of induced signals each inversely proportional to the distance between said designator and said surface; and coordinate value outputting means connected to said position signal producing means for producing coordinate value output signals representative of the coordinate value of the point designated by said designator, wherein said outputting means comprise:

mode setting means responsive to a manual setting operation to designate a selected mode for producing a first control signal when the absolute coordinate mode is designated by a setting operation and a second control signal when the relative coordinate mode is designated by a setting operation;

selecting means responsive to the signal produced by said setting means for producing a first signal representing a first predetermined value when the first control signal is being produced and a second signal representing a second predetermined value greater than the first predetermined value when the second control signal is being produced;

comparator means connected to said position signal producing means and to said selecting means for comparing the maximum induced signal value produced by said position signal producing means with the signal being produced by said selecting means and producing a comparison signal when the maximum induced signal value exceeds the value represented by the signal being produced by said selecting means; and coordinate value calculating means connected to said position signal producing means and to said comparator means for producing a coordinate value output signal from the induced signal value occurring in time coincidence with the comparison signal.

5. Apparatus as defined in claim 4 wherein said calculating means for calculating absolute coordinate values and means for calculating relative coordinate values.

6. Apparatus as defined in claim 5 wherein said calculating means comprise means for operating said means for calculating absolute coordinate values when said mode setting means are producing the first control signal and for operating said means for calculating relative coordinate values when said mode setting means are producing the second control signal.

* * * * *